US010760485B2

(12) United States Patent
Jacobs et al.

(10) Patent No.: US 10,760,485 B2
(45) Date of Patent: Sep. 1, 2020

(54) VIRTUALIZING DATA FOR A VEHICLE CONTROL SYSTEM

(71) Applicant: General Electric Company, Schenectady, NY (US)

(72) Inventors: Douglas Scott Jacobs, Boston, MA (US); John Michael O'Neill, North Andover, MA (US)

(73) Assignee: General Electric Company, Schenectady, NY (US)

(*) Notice: Subject to any disclaimer, the term of this patent is extended or adjusted under 35 U.S.C. 154(b) by 392 days.

(21) Appl. No.: 15/887,025

(22) Filed: Feb. 2, 2018

(65) Prior Publication Data

US 2020/0149472 A1 May 14, 2020

(51) Int. Cl.
| | | |
|---|---|---|
| *B64D 31/06* | (2006.01) | |
| *F02C 6/20* | (2006.01) | |
| *B64D 45/00* | (2006.01) | |
| *F02C 7/32* | (2006.01) | |
| *F02C 7/26* | (2006.01) | |
| *F02D 25/00* | (2006.01) | |

(52) U.S. Cl.
CPC ............... *F02C 6/20* (2013.01); *B64D 45/00* (2013.01); *F02C 7/26* (2013.01); *F02C 7/32* (2013.01); *B64D 2045/0085* (2013.01)

(58) Field of Classification Search
CPC ............................... B64D 31/06; F02D 25/00
USPC ...................................................... 701/29.1
See application file for complete search history.

(56) References Cited

U.S. PATENT DOCUMENTS

| | | | |
|---|---|---|---|
| 5,033,010 A | 7/1991 | Lawrence et al. | |
| 6,308,282 B1 * | 10/2001 | Huang | H04L 69/40 370/216 |
| 7,020,076 B1 * | 3/2006 | Alkalai | H04L 1/22 370/217 |
| 7,769,510 B2 | 8/2010 | Denholm et al. | |
| 7,929,374 B1 | 4/2011 | Grimmett | |
| 7,984,199 B2 | 7/2011 | Ferguson et al. | |
| 8,237,405 B2 * | 8/2012 | Li | H02J 7/0021 320/116 |
| 8,243,614 B2 * | 8/2012 | Driscoll | H04L 1/22 370/252 |
| 9,120,581 B2 | 9/2015 | Costes et al. | |

(Continued)

OTHER PUBLICATIONS

Adibhatla, Advanced Controls and PHM GE Aviation Perspective, PCD Conference NASA GRC, https://www.grc.nasa.gov./www/cdtb/aboutus/workshop2009/GE-Aviation_Adibhatla.pdf, Dec. 8, 2009, pp. 1-23.

*Primary Examiner* — Tan Q Nguyen
(74) *Attorney, Agent, or Firm* — Dority & Manning, P.A.

(57) ABSTRACT

A distributed control system for a vehicle includes one or more processors and one or more memory devices storing computer-readable instructions that, when executed by the one or more processors, cause the one or more processors to perform operations. The operations comprise obtaining an instance of shared data for a control system of the vehicle from each of at least three separate nodes of the distributed control system. The shared data may include configuration or health data for the control system or the vehicle itself. The operations include comparing the at least three instances of shared data; detecting a shared data inconsistency amongst the at least three instances; and generating a control action associated with resolving the shared data inconsistency.

20 Claims, 6 Drawing Sheets

(56) References Cited

U.S. PATENT DOCUMENTS

| | | |
|---|---|---|
| 9,239,578 B2 | 1/2016 | Ziarno |
| 9,607,452 B2 | 3/2017 | Sobanski |
| 9,630,510 B2 | 4/2017 | Sukumaran et al. |
| 9,727,059 B2 | 8/2017 | Greenfield et al. |
| 2013/0253735 A1* | 9/2013 | Roy .................... B64D 31/14 |
| | | 701/3 |
| 2015/0251770 A1 | 9/2015 | Bisson et al. |
| 2015/0291286 A1* | 10/2015 | Darby .................... F02C 9/00 |
| | | 701/100 |
| 2017/0021936 A1 | 1/2017 | Nagashima |

* cited by examiner

VIRTUALIZING DATA FOR A VEHICLE CONTROL SYSTEM

FIELD

The present subject matter relates generally to control systems for a vehicle

BACKGROUND

An engine controller for a gas turbine engine is configured based on data received from one or more plugs mounted to the gas turbine engine. For instance, the one or more plugs may include an engine rating plug that provides data indicative of a thrust rating for the gas turbine engine. Alternatively or additionally, the one or more plugs may include a configuration plug that provides data indicative of one or more hardware variants of the gas turbine engine. In this manner, the engine controller may be configured to control operation of the gas turbine engine differently based on the data received from the one or more plugs. However, the one or more plugs add to the overall weight and cost of the gas turbine engine, which is generally undesirable.

BRIEF DESCRIPTION

Aspects and advantages of the present disclosure will be set forth in part in the following description, or may be obvious from the description, or may be learned through practice of the present disclosure.

In one example embodiment, a distributed control system for a vehicle includes one or more processors and one or more memory devices. The one or more memory devices may store computer-readable instructions that when executed by the one or more processors cause the one or more processors to perform operations. The operations may comprise obtaining an instance of shared data for a vehicle control system from each of the at least three separate nodes of the distributed control system. The operations may include comparing the at least three instances of shared data. The operations may include detecting a shared data inconsistency amongst the at least three instances based on comparing any of the at least three instances of shared data. When a shared data inconsistency is detected, the operations may include generating a control action associated with resolving the shared data inconsistency.

In another example embodiment, a method for managing gas turbine engine configuration includes responsive to detecting initialization of an engine controller for a gas turbine engine, obtaining, by one or more processors of a distributed control system, one or more instances of shared data for an engine control system for a gas turbine engine from at least three separate nodes of the distributed control system. The method may include comparing, by the one or more processors, the at least three instances of shared data. The method may include detecting, by the one or more processors, a shared data inconsistency amongst any of the at least three instances of shared data based on comparing any of the at least three instances of shared data. When the shared data inconsistency is detected, the method may include generating a control action associated with resolving the shared data inconsistency.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

DETAILED DESCRIPTION

Figure 1:
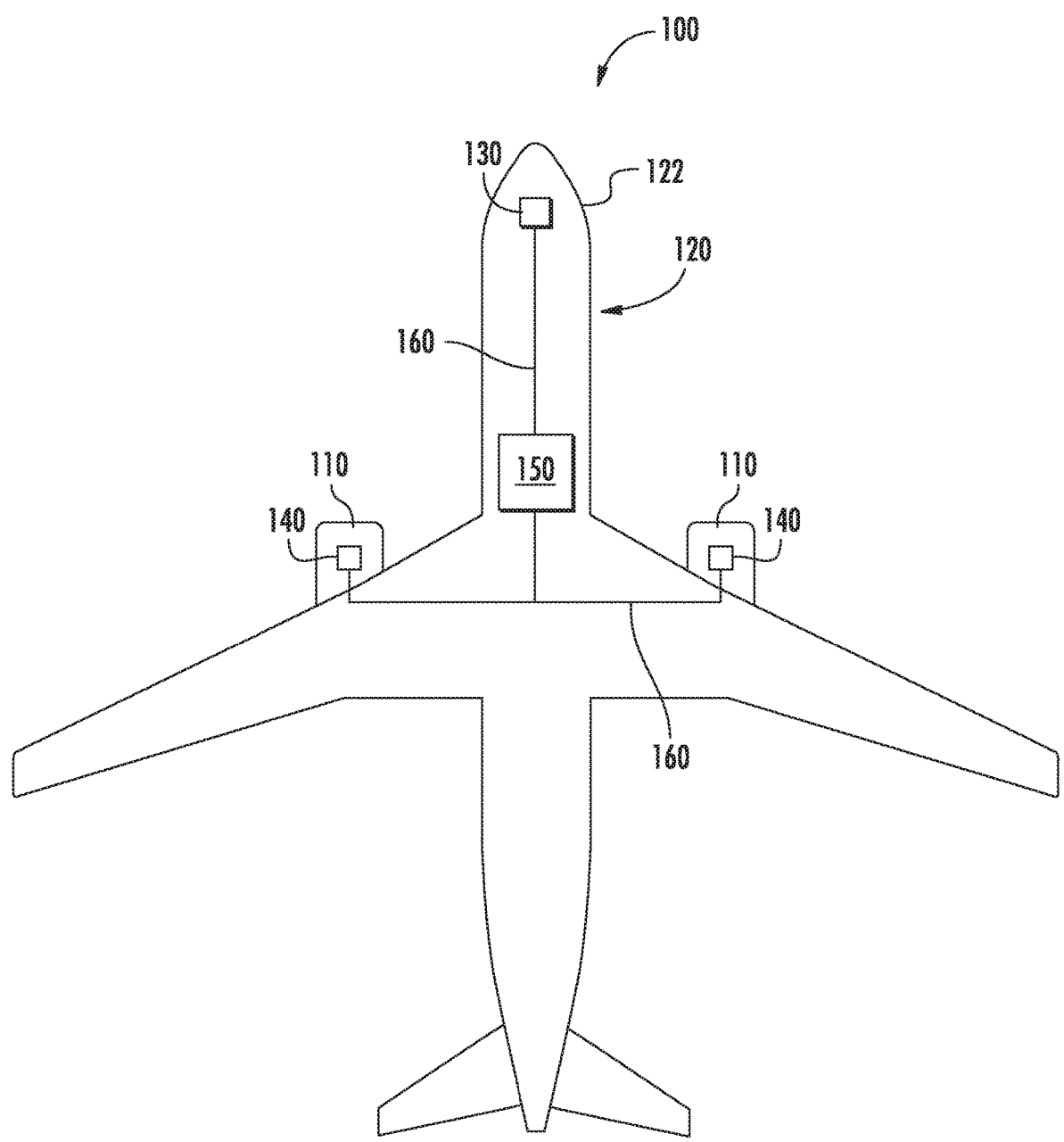
FIG. 1 illustrates an aerial vehicle according to example embodiments of the present disclosure.

Reference will now be made in detail to present embodiments of the present disclosure, one or more examples of which are illustrated in the accompanying drawings. The detailed description uses numerical and letter designations to refer to features in the drawings.

As used in the specification and the appended claims, the terms "first" and "second" may be used interchangeably to distinguish one component from another and are not intended to signify location or importance of the individual components. The singular forms "a", "an", and "the" include plural references unless the context clearly dictates otherwise. The use of the term "about" in conjunction with a numerical value refers to within 25% of the stated amount.

Example aspects of the present disclosure are directed to a distributed control system configured to determine configuration settings for a control system of a vehicle (e.g., aircraft). Alternatively or additionally, the distributed control system may be configured to determine a health of the control system, a gas turbine engine, or the vehicle itself. In example embodiments, the vehicle can be an aircraft. More specifically, the aircraft control system can include an engine control system for a gas turbine engine of the aircraft.

The distributed control system includes at least a first node, a second node, and a third node communicatively coupled to both the first and second nodes. The first node includes a memory device configured to store a first instance of shared data for a gas turbine engine. For instance, shared data may include at least one of configuration data or engine health data for the gas turbine engine. The second node includes a memory device configured to store a second instance of shared data for the gas turbine engine. The third node includes one or more processors and one or more memory devices. The one or more memory devices can be configured to store a third instance of shared data for the gas turbine engine. The one or more memory devices may also be configured to store computer-readable instructions that, when executed by the one or more processors, cause the one or more processors to monitor the first instance of shared data at the first node, the second instance of shared data at the second node, and the third instance of shared data at the third node for inconsistencies.

An engine controller configured to control operation of a gas turbine engine traditionally receives configuration data for the gas turbine engine via a plug-based system that stores a single hardware copy of the configuration data. The plug-based system may include one or more plugs configured to store the configuration data. For example, the plug-based system may include an engine rating plug, a configuration plug, or both. The engine rating plug may be configured to store a thrust rating for the gas turbine engine, whereas the configuration plug may be configured to store one or more configuration settings for a core module or hardware variant of the gas turbine engine. The one or more plugs may be communicatively coupled to the engine controller. In this manner, the engine controller may receive the configuration data and control operation of the gas turbine based, at least in part, on the configuration data.

According to example embodiments of the disclosed technology, a distributed control system is provided that includes a plurality of nodes capable of storing data. A distributed control system may be used to store configuration data for an aircraft control system. In example embodiments, the aircraft control system includes an engine control system for the gas turbine engine. For example, each node of the plurality of nodes may store an instance of shared data for the gas turbine engine. In some examples, the shared data may include configuration data, such as that previously stored by plug-based systems. Additionally, each node of the distributed control system may be able to store a larger amount of data when compared with the plug-based system. For example, each node of the distributed control system may be able to maintain shared data that includes engine health data for the gas turbine engine. In this manner, the distributed control system may use the engine health data to determine an amount of time (e.g., flight hours) remaining before the gas turbine engine needs to be overhauled. Alternatively or additionally, the shared data may include calibration data for one or more actuators, sensors, or controllers of the aircraft control system.

According to some embodiments, the distributed control system is configured to manage multiple instances of shared data distributed at multiple nodes within the system. For example, the distributed control system may be configured to determine the proper configuration settings for the gas turbine engine. As such, the distributed control system may be configured to monitor multiple instances of shared data to determine one or more inconsistencies amongst the plurality of nodes. For instance, the distributed control system may obtain instances of shared data distributed at different nodes within an aerial vehicle and compare the different instances to detect any shared data inconsistencies. If a shared data inconsistency is detected, the control system can generate a control action in order to resolve the shared data inconsistency.

FIG. 1 depicts an aerial vehicle 100 according to example embodiments of the present disclosure. As shown, the aerial vehicle 100 includes one or more gas turbine engine(s) 110, a fuselage 120, a cockpit 122, a display 130 for displaying information to the flight crew, and one or more engine controller(s) 140 configured to control operation of the one or more engine(s) 110. For example, as depicted in FIG. 1, the aircraft 100 includes two gas turbine engines 110 that are controlled by their respective engine controllers 140. For this embodiment, the aircraft 100 includes one engine 110 mounted to or integral with each wing of the aircraft 100. Each engine controller 140 may include, for example, an Electronic Engine Controller (EEC) or an Electronic Control Unit (ECU) of a Full Authority Digital Engine Control (FADEC). Each engine controller 140 includes various components for performing various operations and functions, such as e.g., for collecting and storing flight data from one or more engine or aircraft sensors. Although FIG. 1 shows individual engine controllers for each engine 110, other examples may include a single engine controller 140 for more than one engine of the aerial vehicle 100. Alternatively, each engine 110 may be controlled more than one engine controller 140.

Although not shown, each engine controller 140 may include one or more processor(s) and one or more memory device(s). The one or more processor(s) may include any suitable processing device, such as a microprocessor, microcontroller, integrated circuit, logic device, and/or other suitable processing device. The one or more memory device(s) may include one or more computer-readable media, including, but not limited to, non-transitory computer-readable media, RAM, ROM, hard drives, non-volatile memory (NVM), electronically erasable programmable read only memory (EEPROM), flash drives, and/or other memory devices.

The one or more memory device(s) may store information accessible by the one or more processor(s), including computer-readable instructions that may be executed by the one or more processor(s). The instructions may be any set of instructions that when executed by the one or more processor(s) cause the one or more processor(s) to perform operations. The instructions may be software written in any suitable programming language or may be implemented in hardware. Additionally, and/or alternatively, the instructions may be executed in logically and/or virtually separate threads on processor(s).

The memory device(s) may also store any suitable type of data. For instance, the memory device(s) may store configuration data for the gas turbine engine. Alternatively or additionally, the memory device(s) may store health data for the gas turbine engine. The memory device(s) may also store calibration data and/or sensor data received from one or more sensors included within the engine control system.

The engine controller(s) 140 may also include a communication interface used to communicate, for example, with the other components of the aircraft 100 (e.g., via a communication network 150). The communication interface may include any suitable components for interfacing with one or more network(s), including for example, transmitters, receivers, ports, controllers, antennas, and/or other suitable components.

The engine controller(s) 140 are communicatively coupled with the communication network 150 of the aircraft 100. The communication network 150 may include, for example, a local area network (LAN), a wide area network (WAN), SATCOM network, VHF network, a HF network, a Wi-Fi network, a WiMAX network, a gatelink network, ARINC, MIL-STD-1153, Ethernet, CAN, RS-485, and/or any other suitable communications network for transmitting messages to and/or from the aircraft 100, such as to a cloud computing environment and/or the off board computing systems. Such networking environments may use a wide variety of communication protocols. The communication network 150 includes any combination of wired and/or wireless communication links. In one example embodiment, the communication network 150 includes a data bus. The communication network 150 may also be coupled to the one or more engine controller(s) 140 using any suitable communication system 160, such as through communication cables or by various wireless protocols.

The aircraft 100 of FIG. 1 is depicted by way of example, not limitation. Although much of the present disclosure is described with respect to the aircraft 100, it will be appreciated that embodiments of the disclosed technology may be used with any vehicle, such as unmanned marine vehicles and unmanned ground vehicles. For example, the disclosed control systems may be used with boats, submarines, cars, trucks, or any other vehicle capable of locomotion.

Figure 2:
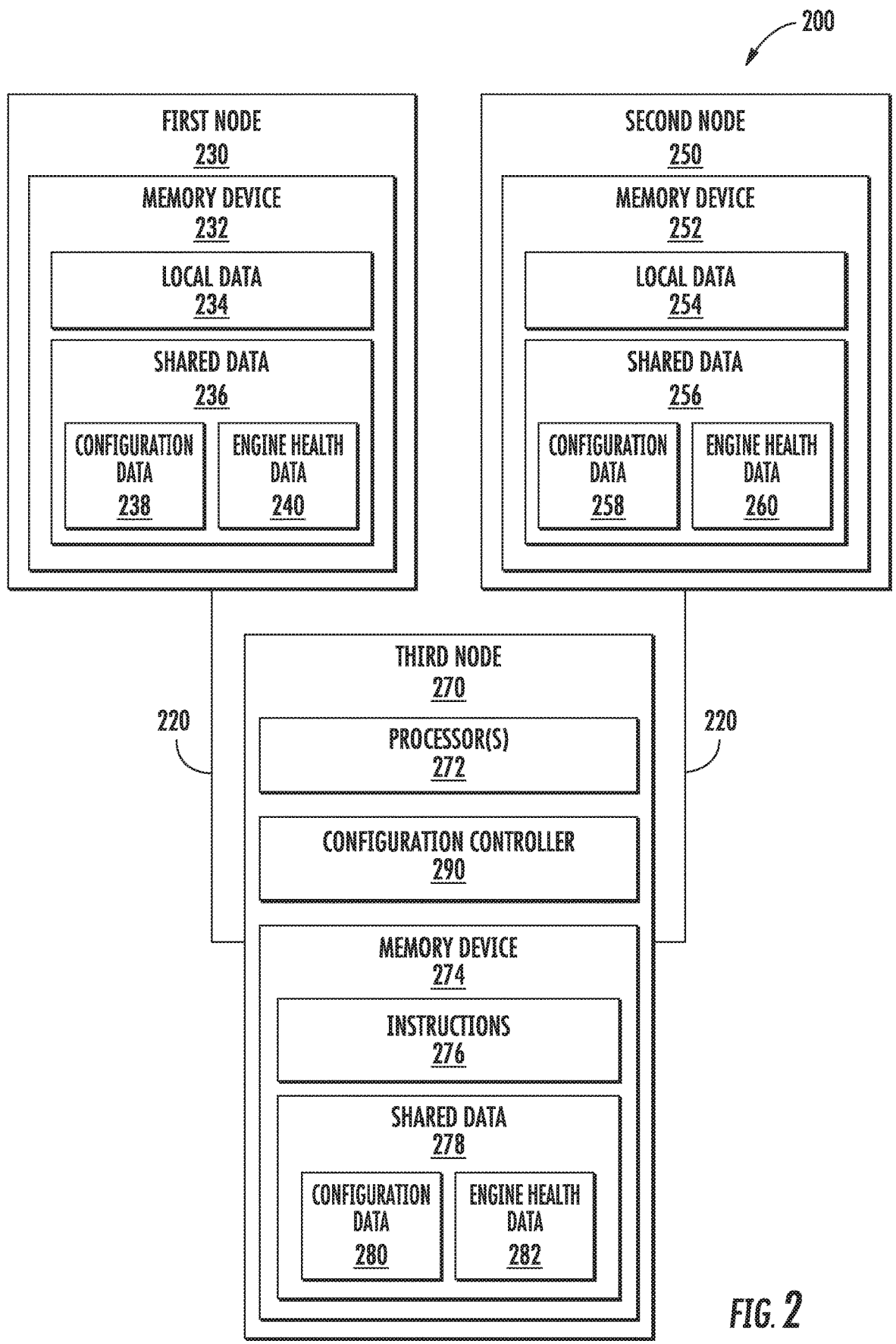
FIG. 2 illustrates a distributed control system according to example embodiments of the present disclosure.

FIG. 2 depicts a distributed control system 200 for an aircraft according to example embodiments of the present disclosure. As shown, the distributed control system 200 includes at least a first node 230, a second node 250, and a third node 270 communicatively coupled to both the first node 230 and the second node 250. It should be appreciated that the first node 230, second node 250, and third node 270 are physically separate components. However, the nodes 230, 250, 270 may be communicatively coupled using any type of communication system 220, such as via one or more communication cables or by various wireless protocols. In some implementations, the first node 230 and second node 250 may each be at least one of a sensor, an actuator, a data concentrator, or a controller. For instance, the first node 230 may be a first sensor configured to detect a first operating parameter (e.g., temperature, pressure, etc.) associated with a gas turbine engine, such as one of the gas turbine engines 110 depicted in FIG. 1. Alternatively, the distributed control module at the first node 230 may be an actuator configured to control operation of one or more components (e.g., valve) of the gas turbine engine. The second node 250 may include a second sensor configured to detect a second operating parameter associated with the gas turbine engine. The third node 270 may include one of the engine controllers 140 depicted in FIG. 1. In alternative embodiments, the third node 270 may be a flight management computer, a flight control computer, or any combination of these computers and/or controllers. In another example, the third node 270 may be a dedicated node, circuit, and/or processor associated with management of shared data as described herein. The third node may include dedicated hardware and/or software configured to manage the shared data distributed at other nodes of the distributed control system 200. As will be discussed below in more detail, the nodes 230, 250, 270 may each include a memory or other storage device configured to store an instance of shared data for the gas turbine engine.

As shown, the first node 230 includes a memory device 232 configured to store local data 234 and a first instance 236 of shared data for an aircraft control system for the aircraft. In example embodiments, the aircraft control system includes an engine control system for one or more gas turbine engines of the aircraft. The local data 234 may include calibration data for the first node 230. Alternatively or additionally, the local data 234 may include operating parameters and/or control logic. The first instance 236 of shared data is distinct from the local data 234 and includes at least one of configuration data 238 or engine health data 240. In example embodiments, the configuration data 238 may include a thrust rating for the gas turbine engines 110. Alternatively or additionally, the configuration data 238 may include data indicative of one or more settings for one or more hardware modules of the aircraft or gas turbine engine. The engine health data 240 may include data indicative of a number of flight hours or operating hours for the gas turbine engine. More specifically, the flight hours can be used to determine an amount of life remaining for the gas turbine engine or one or more life limited components of the gas turbine engine. Alternatively or additionally, the engine health data may include an amount of time the gas turbine engine has operated at or above a setpoint temperature. Other examples of engine health data may be indicative of a total number of engine operating hours, engine cycle counts, engine starts, or cumulative calculated damage to engine hardware.

The second node 250 includes a memory device 252 configured to store local data 254 and a second instance 256 of shared data for the gas turbine engine. The second instance 256 of shared data may include at least one of configuration data 258 and engine health data 260. It should be appreciated that the configuration data 258 and engine health data 260 may include any of the example data mentioned above with respect to the first instance 236 of shared data. In alternative embodiments, the shared data 278 may be stored in a separate memory device.

The third node 270 may include one or more processor(s) 272 and a memory device 274. In some implementations, the memory device 274 is configured to store computer-readable instructions 276 and a third instance 278 of shared data for the gas turbine engine. The third instance 278 of shared data may include at least one of configuration data 280 and engine health data 282. It should be appreciated that the configuration data 280 and engine health data 282 may include any of the example data mentioned above with respect to the first instance 236 of shared data.

Three nodes including instances of shared data are shown in FIG. 2 by way of example. According to various embodiments, a distributed control system may include at least three nodes as depicted in FIG. 2.

As shown, the third node 270 may include a configuration controller 290. In example embodiments, the configuration controller 290 may be implemented using hardware, software, or combinations of hardware or software. Suitable hardware may include, but is not limited to a processor, a field programmable gate-array, an application specific integrated circuit (ASIC), digital or analog electrical circuit, packaged hardware units, and the like. Suitable software may include, but is not limited to, a portion of program code that is executable by a processor to perform a particular function or set of functions, a self-contained software component, firmware, and the like. The configuration controller 290 may include software stored in a processor readable storage device to program a processor to perform the functions described herein. The configuration controller 290 may be implemented on the processor(s) 272 of the third node 270. Alternatively, the configuration controller 290 may be stored in a dedicated memory device (not shown) of the third node 270. As will be discussed below in more detail, the configuration controller 290 may monitor multiple instances of shared data within the distributed control system 200 for one or more inconsistencies.

Figure 3:
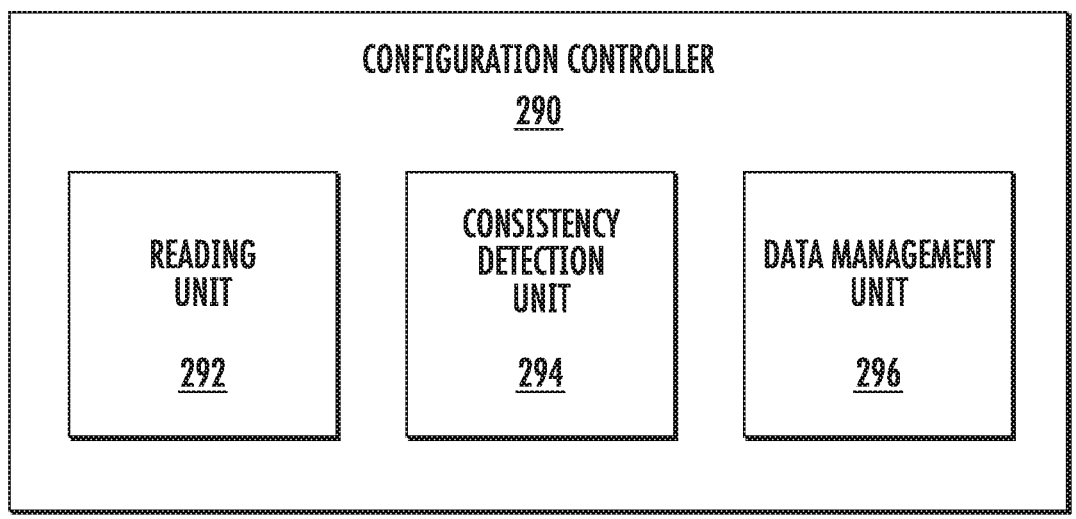
FIG. 3 illustrates a block diagram of a configuration controller according to example embodiments of the present disclosure.

FIG. 3 depicts a configuration controller 290 according to example embodiments of the present disclosure. The configuration controller 290 may be used to monitor at least the first, second, and third instances of shared data for one or more inconsistencies. The configuration controller 290 may be further configured to generate one or more control actions in response to detecting the one or more inconsistencies. The configuration controller 290 includes a reading unit 292, a consistency detection unit 294, and a data management unit 296. The individual units of the configuration controller 290 may be configured as described above with respect to the configuration controller 290. Each unit may be implemented using software, hardware, or any combination of hardware and software. The individual units may be configured together in a single unit such as a single processing unit or may be configured in distributed components. The different units may be formed using different software and/or hardware combinations.

In example embodiments, the reading unit 292 obtains at least three instances of shared data within the distributed control system 200. For instance, the reading unit 292 may obtain the first instance 236 of shared data from the first node 230, the second instance 256 of shared data from the second node 250, and the third instance 278 of shared data from the third node 270.

In example embodiments, the reading unit 292 may obtain an instance of shared data by issuing a command to one of the plurality of nodes included in the distributed control system 200. For example, the reading unit 292 may obtain the first instance 236 of shared data by issuing a read command to the first node 230. Alternatively, the nodes 230, 250, 270 of the distributed control system 250 may be programmed to communicate instances of shared data to the reading unit 292 at predetermined intervals. For example, the first node 230 may be programmed to communicate the first instance 236 of shared data to the reading unit 292 every minute, or any other suitable amount of time.

In example embodiments, the consistency detection unit 294 may compare the first, second, and third instances 236, 256, and 278 of shared data to detect a shared data inconsistency between at least two of the first, second, and third instances 236, 256, 278 of shared data. In example embodiments, the shared data inconsistency may include a consistency and/or an inconsistency. For instance, a consistency may exist between the second instance 256 and the third instance 278, whereas an inconsistency may exist between the first instance 236 and the second and third instance 256, 278. In alternative embodiments, the shared data inconsistency may include an inconsistency between each of the first instance 236, the second instance 256, and the third instance 278.

In example embodiments, the data management unit 296 may generate one or more control actions based on the shared data inconsistency detected by the consistency detection unit 294. For instance, when the shared data inconsistency includes a consistency between instances and an inconsistency between other instances, the data management unit 296 may issue a command to overwrite or correct one of the instances 236, 256, 278 of shared data to resolve the inconsistency. As an example, the data management unit 296 may issue a command to overwrite the first instance 236 with one of the second or third instances 256, 278 when the inconsistency is between the first instance 236 and the second and third instances 256, 278.

When the shared data inconsistency exists between each of the first, second, and third instances 236, 256, and 278 of shared data, the control action may include generating a notification to perform a maintenance action on at least one of the first node 230, the second node 250, or the third node 270. An example of a maintenance action may include, without limitation, replacing at least one of the first node 230, the second node 250, or the third node 270. Alternatively, at least one of the first node 230, the second node 250, or the third node 270 may be reprogrammed using a ground service interface. In one embodiment, the system is configured to determine a valid instance of shared data and copy the valid instance to each of the nodes when the inconsistency is between each instance of shared data. An indication of the valid instance may be provided by a user in one example, or determined by other techniques. In another embodiment, the control action may also include issuing a command to operate the gas turbine engine in a fail-safe operating mode. In this manner, the gas turbine engine may continue to operate in a safe manner despite the shared data inconsistency.

Figure 4:
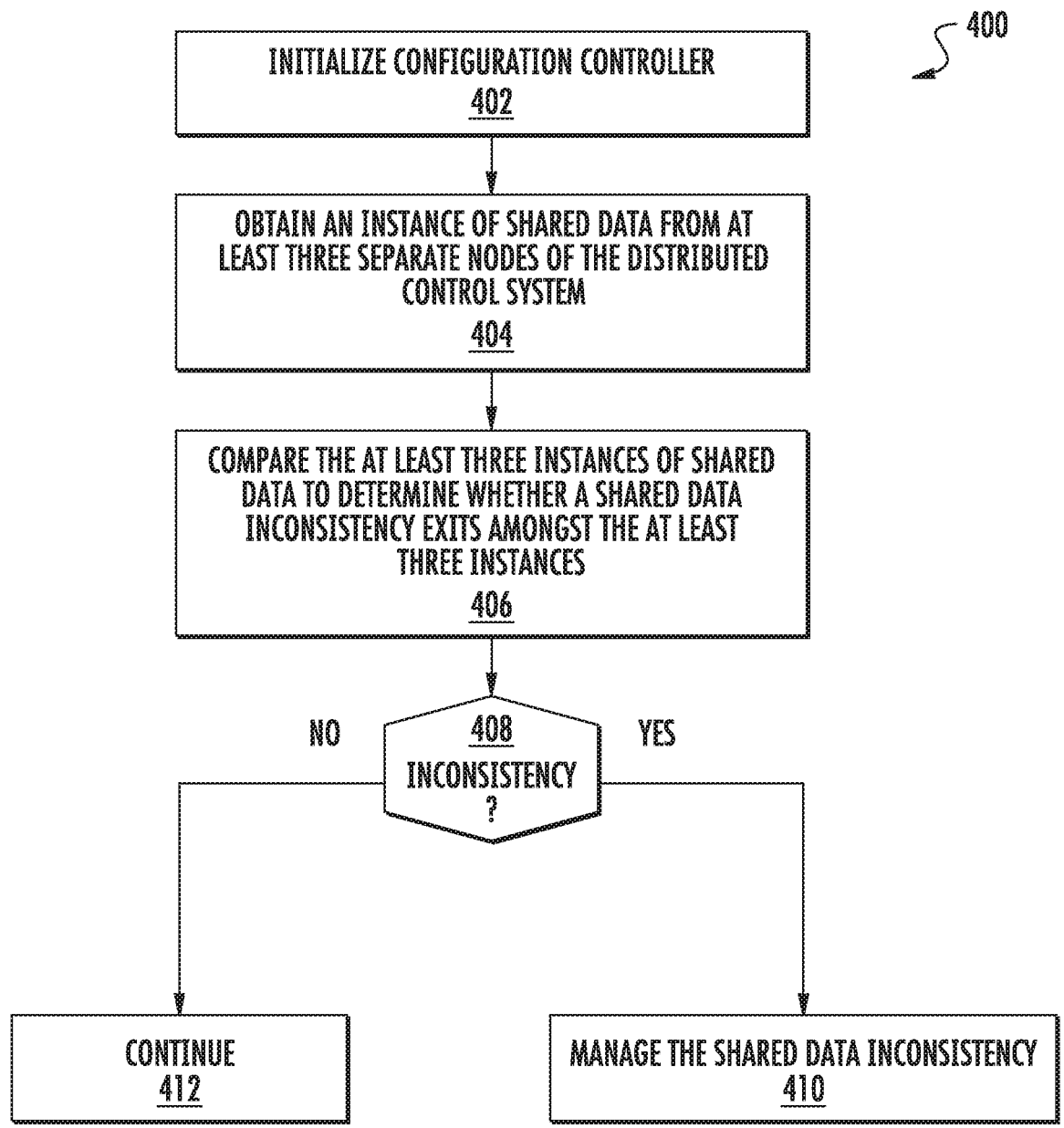
FIG. 4 illustrates a flow diagram of a method for determining gas turbine engine configuration according to example embodiments of the present disclosure.

FIG. 4 depicts a flow diagram of an example method 400 for determining gas turbine engine configuration. The method 400 may be implemented using, for instance, the configuration controller 290 discussed above with reference to FIGS. 2 and 3. FIG. 4 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously or modified in various ways without deviating from the scope of the present disclosure.

At (402), the method 400 includes initializing the configuration controller. In some implementations, initializing the configuration controller occurs each time the third node of the distributed control system is activated. The configuration controller may be initialized when powering-up the third node, resetting the third node, or in response to other events. It should be appreciated, however, that the configuration controller may be associated with any one of the plurality of nodes of the distributed control system.

At (404), the method 400 includes obtaining an instance of shared data from each of the at least three nodes of the distributed control system. As an example, the reading unit of the configuration controller may obtain the first, second, and third instances of shared data from the first, second, and third nodes, respectively.

At (406), the method 400 includes comparing the at least three instances of shared data obtained at (404) to determine whether a shared data inconsistency exists amongst the at least three instances of shared data. More specifically, the consistency detection unit of the configuration controller may compare the at least three instances of shared data to determine whether the shared data inconsistency exists amongst the multiple instances of shared data. The consistency detection unit may apply hashing, parity checks, checksum algorithms, or any other suitable technique to detect inconsistencies in data. As an example, the consistency detection unit may be configured to compare only an identifier (e.g., checksum, parity bit) associated with each instance of the at least three instances. In this manner, the instances can be compared in a more efficient manner.

In example embodiments, comparing multiple instances of shared data may include comparing the first instance of shared data, the second instance of shared data, and the third instance of shared data. In this manner, the consistency detection unit of the configuration controller may determine whether a shared data inconsistency exists amongst the at least three instances of shared data.

At (408), the method includes determining whether a shared data inconsistency exists. A shared data inconsistency may exist when an inconsistency exists between a minority of the at least three instances and a majority of the at least three instances of shared data. For example, a shared data inconsistency may exist when the first and second nodes are storing consistent instances, but the third node is not storing an instance of the corresponding shared data. Alternatively, a shared data inconsistency may exist when an inconsistency exists between each of the at least three separate nodes of the distributed control system. As will be discussed below in more detail, the method 400 proceeds to (410) when the consistency detection unit determines a shared data inconsistency exists. Otherwise, the method 400 proceeds to (412).

At (410), the method 400 includes managing a shared data inconsistency detected at (408). More specifically, the data management unit of the configuration controller may be used to manage the shared data inconsistency. In example embodiments, managing the shared data inconsistency may include generating one or more control actions. As will be discussed below, the control actions may vary based on the shared data inconsistency detected at (408).

If, when the shared data inconsistency is detected at (408), a shared data consistency amongst a majority of the at least three instances is also detected, the one or more control actions may include overwriting any minority instances (e.g., an inconsistent instance) of the at least three instances with one of the majority instances (e.g., consistent instances). In one example embodiment, a shared data inconsistency detected at (408) may include a consistency between the second instance and the third instance. In addition, the shared data inconsistency may include an inconsistency between the first instance and the second and third instances. As such, managing the shared data inconsistency may include overwriting the first instance of shared data with one of the second or third instances of shared data. In this manner, the shared data inconsistency may be resolved.

In example embodiments, the distributed control system may include more than three nodes. For instance, the distributed control system may include five separate nodes, and each node may include an instance of shared data. As such, a shared data inconsistency detected at (408) may include a shared data consistency amongst the first, second, and three nodes. In addition, both the fourth and fifth instances of shared data may be inconsistent with the first, second, and third instances of shared data. As such, managing the shared data inconsistency may include overwriting the fourth and fifth instances of shared data with one of the first, second or third instances of shared data. In this manner, the shared data inconsistency may be resolved.

When the shared data inconsistency detected at (408) includes an inconsistency between each of the at least three instances, the control action(s) may include generating a notification to perform a maintenance action on at least one of the at least three separate nodes of the distributed control system. For instance, the maintenance action may include, without limitation, replacing at least one of the first, second or third nodes. In another example, a maintenance action may include repairing, reprogramming, or creating a new instance of the shared data at each of the nodes. Alternatively or additionally, the control action(s) may include issuing a command to operate the gas turbine engine in a fail-safe operating more. In this manner, the gas turbine engine may continue to operate in a safe manner despite the shared data inconsistency.

At (412), the method 400 may terminate. Alternatively, the method 400 may continue. Various processes may be performed at (412). For example, (412) may include monitoring shared data stored at various nodes of the distributed control system. In this manner, the shared data may be continuously monitored for one or more inconsistencies. For example, the method may revert to (404) at (412) when a change to any node or instance of shared data is detected. In some examples, the configuration controller may be deactivated at (412), either immediately after verifying data consistency or after a predetermined amount of time. In alternative embodiments, the configuration controller may, at (412), be configured to detect the gas turbine engine operating in one of a plurality of pre-defined operating states, such as a shutdown state in which the gas turbine engine is powering down. When the configuration controller determines the gas turbine engine is operating in one of the plurality of pre-defined operating states, the configuration controller may be configured to overwrite each instance of the at least three instances of shared engine health data with updated engine health data. In this manner, the distributed control system can maintain up-to-date engine health data indicating a remaining life of the gas turbine engine or one or more life-limited components thereof.

Figure 5:
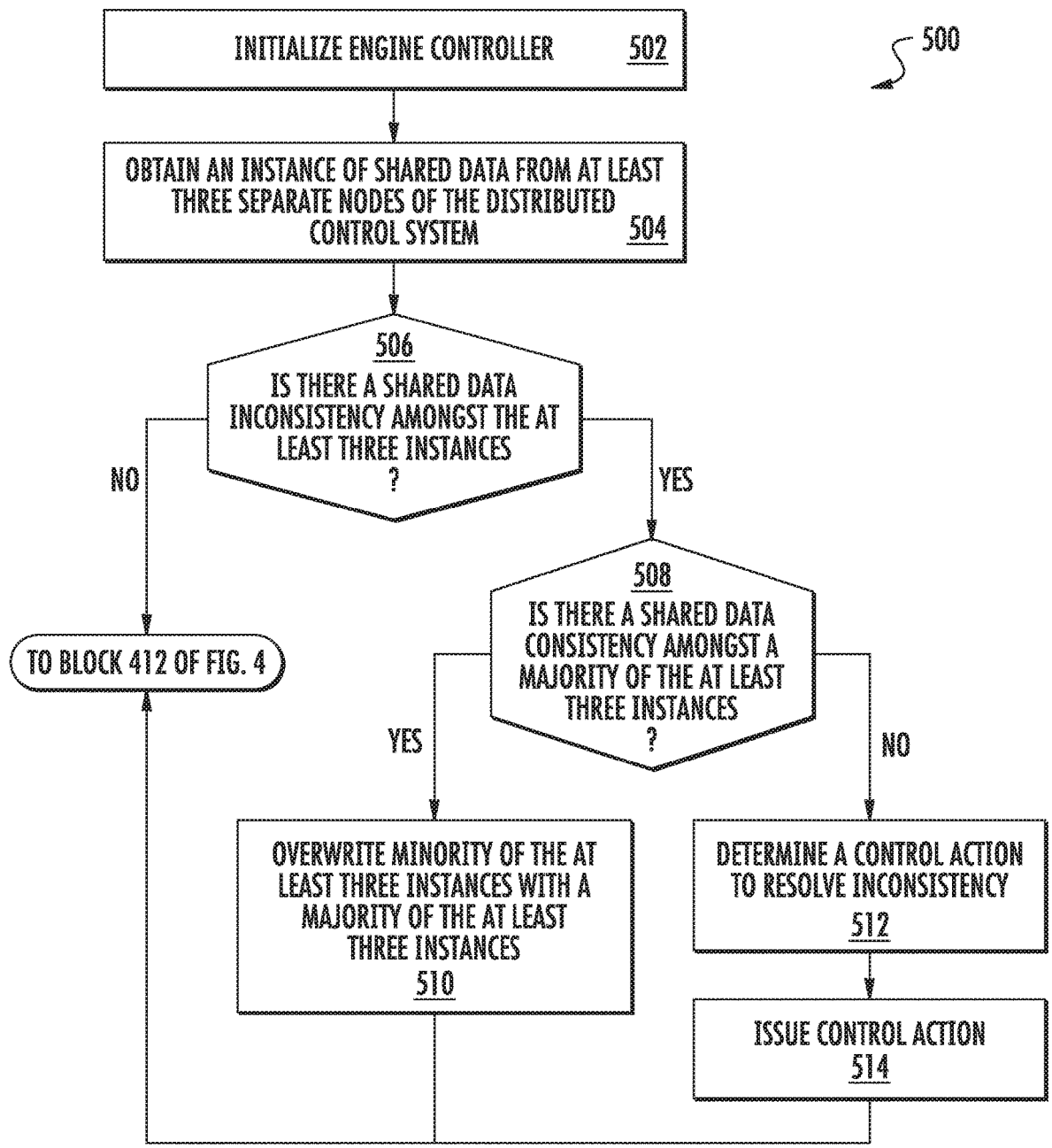
FIG. 5 illustrates a flow diagram of a method for determining gas turbine engine configuration according to example embodiments of the present disclosure.

FIG. 5 depicts a flow diagram of an example method 500 for managing a shared data inconsistency associated with a gas turbine engine configuration according to example embodiments of the disclosed technology. It should be appreciated, however, that the method 500 may be used to manage a shared data inconsistency associated with any suitable control system of an aircraft. In example embodiments, the method 500 may be implemented using, for instance, the distributed control system discussed above with reference to FIG. 2.

At (502), the method 500 includes initializing an engine controller associated with the distributed control system. In some implementations, block 502 may include initializing the configuration controller as shown at block 402 of method 400.

At (504), the method 500 includes obtaining an instance of shared data from each of the at least three nodes of the distributed control system. For instance, (504) may include obtaining the first instance of shared data associated with the first node of the distributed control system; obtaining the second instance of shared data associated with the second node of the distributed control system; and obtaining the third instance of shared data associated with the third node of the distributed control system. In example embodiments, the reading unit of the configuration controller may obtain an instance of shared data from each of the at least three separate nodes of the distributed control system. In some implementations, block 504 may include obtaining the data instances obtained as shown at block 404 of method 400.

At (506), the method 500 includes determining whether a shared data inconsistency exists amongst the at least three instances of shared data. In example embodiments, the consistency detection unit may compare the at least three instances of shared data to detect a shared data inconsistency amongst the at least three instances of shared data. When the shared data inconsistency exists, the method proceeds to (508). Otherwise, the method 500 proceeds to block 412 of method 400.

At (508), the method 500 includes determining whether the shared data inconsistency detected at (506) includes a shared data consistency amongst a majority of the at least three instances of shared data. In example embodiments, the consistency detection unit may compare the at least three instances of shared data to determine whether a majority of the at least three instances are consistent with one another. When a majority of the at least three instances are consistent with one another, the method 500 proceeds to (510). Otherwise, the method 500 proceeds to (512).

At (510), the method 500 includes overwriting a minority of the at least three instances of shared data with a majority of the at least three instances of shared data. In some examples, the inconsistent instance may occur when a sensor associated with the first node is replaced. As such, the first instance of shared data may be overwritten with one of the second or third instances of shared data. In another example, the inconsistent instance may occur when the engine controller associated with the third node is replaced. As such, the third instance of shared data may be overwritten with one of the first or second instances of shared data. In yet another example, the inconsistent instance may occur when there is a single bit upset in the memory device due to neutron induced faults per the atmospheric neutron flux at higher altitude After the inconsistent instance is overwritten with one of the two consistent instances to resolve the shared data inconsistency, the method 500 proceeds to block 412 of method 400.

At (512), the method 500 includes determining a control action to resolve the shared data inconsistency. In example embodiments, the control action includes replacing the shared data at each of the at least three nodes, or replacing at least one of the at least three separate nodes. After selecting one or more control actions, the method proceeds to (514).

At (514), the method 500 includes issuing the control action. In example embodiments, the control action may include providing a notification to perform a maintenance action on at least one of the at least three nodes of the distributed control system. For instance, the notification may be provided to a feedback device located within a cockpit of the aerial vehicle. The feedback device may be configured to display the notification. In this manner, an operator of the aerial vehicle may view the notification and take an appropriate action to resolve the shared data inconsistency. In another example embodiment, the control action may include a command to operate the gas turbine engine in a fail-safe operating mode. In this manner, the gas turbine engine may continue to operate in a safe manner despite the shared data inconsistency. Alternatively or additionally, the control action may include a command to overwrite each of the first, second, and third instances of shared data based, at least in part, on an operating condition of the gas turbine engine. After issuing the control action, the method 500 proceeds to block 412 of method 400.

Figure 6:
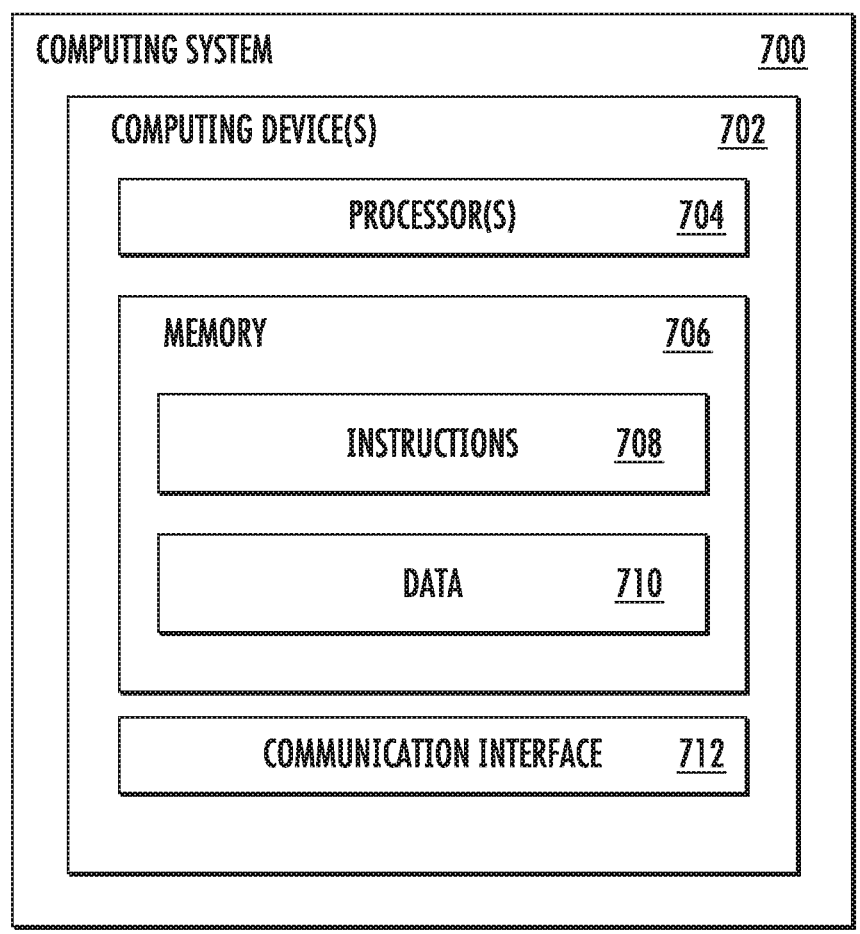
FIG. 6 illustrates a block diagram of a computing system according to example embodiments of the present disclosure.

FIG. 6 depicts a block diagram of an example computing system 700 that may be used by a distributed control system, or other systems to implement methods and systems according to example embodiments of the present disclosure. As shown, the computing system 700 may include one or more computing device(s) 702. The one or more computing device(s) 702 may include one or more processor(s) 704 and one or more memory device(s) 706. The one or more processor(s) 704 may include any suitable processing device, such as a microprocessor, microcontroller, integrated circuit, logic device, or other suitable processing device. The one or more memory device(s) 706 may include one or more computer-readable media, including, but not limited to, non-transitory computer-readable media, RAM, ROM, hard drives, flash drives, or other memory devices.

The one or more memory device(s) 706 may store information accessible by the one or more processor(s) 704, including computer-readable instructions 708 that may be executed by the one or more processor(s) 704. The instructions 708 may be any set of instructions that when executed by the one or more processor(s) 704, cause the one or more processor(s) 704 to perform operations. The instructions 708 may be software written in any suitable programming language or may be implemented in hardware. In some embodiments, the instructions 708 may be executed by the one or more processor(s) 704 to cause the one or more processor(s) 704 to perform operations, such as implementing one or more of the processes mentioned above.

The memory device(s) 704 may further store data 710 that may be accessed by the processor(s) 704. For example, the data 710 may include a third instance of shared data for a gas turbine engine, as described herein. The data 710 may include one or more table(s), function(s), algorithm(s), model(s), equation(s), etc. according to example embodiments of the present disclosure.

The one or more computing device(s) 702 may also include a communication interface 712 used to communicate, for example, with the other components of system. The communication interface 712 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A distributed control system for a vehicle, comprising:
   one or more processors; and
   one or more memory devices, the one or more memory devices storing computer-readable instructions that, when executed by the one or more processors, cause the one or more processors to perform operations, comprising:
   obtaining an instance of shared data for a vehicle control system from each of at least three separate nodes of the distributed control system;
   comparing the at least three instances of shared data;
   detecting a shared data inconsistency amongst any of the at least three instances based on comparing the at least three instances; and
   responsive to detecting the shared data inconsistency, generating a control action associated with resolving the shared data inconsistency.

2. The distributed control system of claim 1, wherein:
the shared data inconsistency comprises a shared data consistency amongst a majority of the at least three instances; and
the control action includes overwriting a minority instance of the at least three instances with one instance of the majority instances.

3. The distributed control system of claim 1, wherein:
the shared data inconsistency does not include a shared data consistency amongst a majority of the at least three instances; and
the control action includes generating a notification to perform a maintenance action on at least one of the at least three separate nodes.

4. The distributed control system of claim 1, wherein each node of the at least three separate nodes comprises at least one of a sensor, actuator, data concentrator, or controller.

5. The distributed control system of claim 1, wherein comparing the at least three instances of the shared data comprises comparing an identifier associated with each instance of the at least three instances.

6. The distributed control system of claim 1, wherein the one or more processors perform the operations each time the one or more processors are initialized.

7. The distributed control system of claim 1, wherein:
the vehicle control system includes an engine control system for a gas turbine engine; and
the shared data comprises at least one of configuration data for the gas turbine engine or engine health data for the gas turbine engine.

8. The distributed control system of claim 7, wherein the configuration data comprises at least one of a thrust rating for the gas turbine engine and calibration data for one or more components of the gas turbine engine.

9. The distributed control system of claim 7, wherein the engine health data comprises data indicating a number of flight hours or operating hours for the gas turbine engine.

10. The distributed control system of claim 7, wherein the engine health data comprises data indicating a number of cycle events for the gas turbine engine, the number of cycle events indicating a number of times the gas turbine engine has been operated at one or more predefined conditions.

11. The distributed control system of claim 7, wherein the operations further comprise:
detecting the gas turbine engine operating in one of a plurality of operating states; and
responsive to detecting the gas turbine engine operating in one of the plurality of operating states, overwriting all of the at least three instances of the engine health data with updated engine health data.

12. A method for managing gas turbine engine configuration, comprising:
responsive to detecting initialization of an engine controller for a gas turbine engine, obtaining, by one or more processors of a distributed control system, one or more instances of shared data for an engine control system for the gas turbine engine from each of at least three separate nodes of the distributed control system;
comparing, by the one or more processors, the at least three instances of shared data;
detecting, by the one or more processors, a shared data inconsistency amongst any of the at least three instances based on comparing the at least three instances of shared data; and
responsive to detecting the shared data inconsistency, generating a control action associated with resolving the shared data inconsistency.

13. The method of claim 12, wherein:
the shared data inconsistency includes a shared data consistency amongst a majority of the at least three instances; and
the control action includes overwriting a minority instance of the at least three instances with one instance of the majority instances.

14. The method of claim 12, wherein:
the shared data inconsistency does not include a shared data consistency amongst a majority of the at least three instances; and
the control action includes generating a notification to perform a maintenance action on at least one of the at least three separate nodes.

15. The method of claim 14, wherein the maintenance action comprises replacing or reprogramming at least one of the at least three separate nodes.

16. The method of claim 12, wherein each node of the at least three separate nodes comprises at least one of a sensor, actuator, data concentrator, or controller.

17. The method of claim 12, wherein comparing the at least three instances of the shared data comprises comparing an identifier associated with each instance of the at least three instances.

18. The method of claim 12, wherein the shared data comprises at least one of configuration data for the gas turbine engine, engine health data for the gas turbine engine, or calibration data for one or more components of the gas turbine engine.

19. The method of claim 18, wherein the method further comprises:
detecting the gas turbine engine operating in one of a plurality of operating states; and
responsive to detecting the gas turbine engine operating in one of the plurality of operating states, overwriting the at least three instances of the engine health data with updated engine health data.

20. The method of claim 19, wherein the one of the plurality of operating states is a shutdown state in which the gas turbine engine is shutting down.

* * * * *